Oct. 19, 1937.   B. C. PLACE   2,096,648
SNAP FASTENER
Filed March 9, 1933
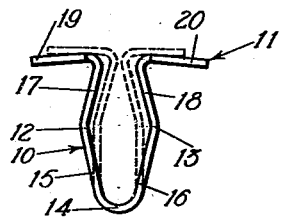
Fig.1
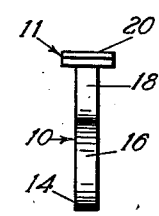
Fig.2
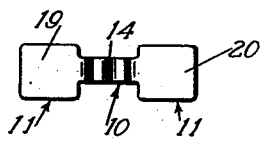
Fig.3
Fig.4
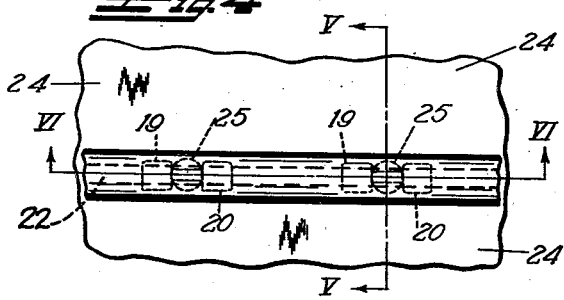
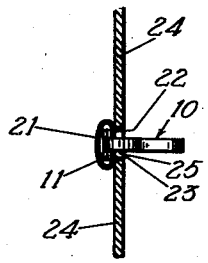
Fig.5
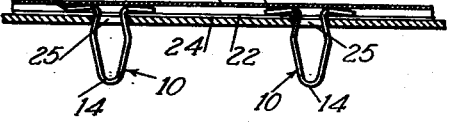
Fig.6
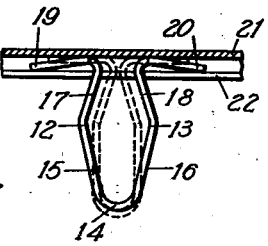
Fig.7
Fig.8
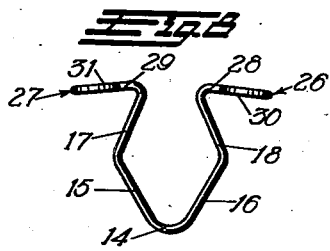
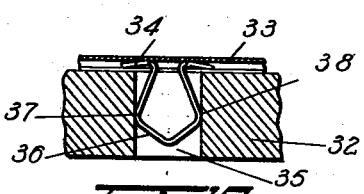
Fig.10
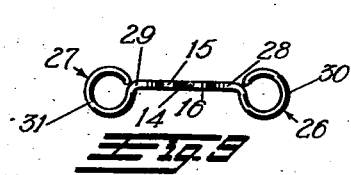
Fig.9
Inventor
Bion C. Place
By Strauch & Hoffman
Attorney Patented Oct. 19, 1937

2,096,648

UNITED STATES PATENT OFFICE 2,096,648

SNAP FASTENER

Bion C. Place, Detroit, Mich., assignor of one-half to George E. Gagnier, Detroit, Mich.

Application March 9, 1933, Serial No. 660,181

3 Claims. (Cl. 24—213)

This invention relates to spring fasteners especially designed for attaching hollow moldings or the like upon metallic or similar supporting structures, and to improved combinations including said fastener, a hollow molding, and the supporting structure upon which the molding is secured.

More particularly, the invention relates to a spring fastener intended for securing moldings in position, which fastener includes an expansible and contractible head as well as an expansible and contractible shank, and to new combinations involving said fastener.

In the construction of automobile bodies or the like, hollow metallic moldings are frequently used to provide a neat appearing finish for relatively narrow exposed surfaces, and for neatly covering joints between adjacent parts of the body.

The primary object of this invention is to provide a fastener designed so that the head thereof possesses inherent expansibility and contractibility in a direction parallel to the length of the shank of the fastener, so that the fastener will be able to maintain itself in position along the length of said molding without the necessity for using further elements to complicate the arrangement and accomplish said function.

Another object of the invention is to provide a spring fastener especially adapted for securing the moldings in place, which fastener includes a compressible head and a compressible shank, the compressibility of the head being relied upon to position the fastener within the molding and the compressibility of the shank being relied upon to give the fastener the capability of being snapped in an opening in a supporting structure.

Another object of the invention is to provide a spring fastener consisting of head sections that are normally in angular relation to each other, and carried by the shank of the fastener so that upon contraction or expansion of the shank the angular relations of the head sections to the shank are varied.

Another object of the invention is to provide a spring fastener constructed of a single piece of tempered metal bent so as to provide a head that may be contracted in thickness when it is entered in the channel of a molding to the end that it will engage walls of said channel and be maintained in position during the application of the molding.

Another object of the invention is to provide a spring fastener having a head and a shank constructed of a single piece of metal bent so that upon contraction of the shank the overall thickness of the head is reduced to the end that the fastener may be freely adjusted along the length of a molding in which the head fits upon contraction of the shank, and so that the head of the fastener is resiliently held between walls of the molding when the shank of the fastener is permitted to expand.

A still further object of the invention is to provide a hollow molding and spring fasteners to secure it in place, which fasteners are sprung in the molding and normally maintained in any position along the length thereof due to the inherent resilience of the heads of the fasteners, but in which the fastener may be freed for unrestricted movement along the length of the molding by contracting the shank of the fastener.

A still further object of the invention is to provide an arrangement including a molding attached to a supporting structure by means of one-piece fasteners the shanks of which are formed to resiliently draw the molding toward the supporting structure and the heads of which are formed to provide a resilient contact between the fastener and the molding, so that the molding is held in place yieldingly due to the resilience of both the head and the shank of the fastener.

Further objects of the invention will appear as a description thereof proceeds with reference to the accompanying drawing in which:

Figures 1, 2 and 3 are respectively, side and end elevations and a top view of the preferred form of one-piece spring fastener constituting a part of the present invention.

Figure 4 is a fragmentary view showing a portion of a supporting structure and a section of molding secured in place thereon by the fasteners of the present invention.

Figure 5 is a sectional view taken on the plane indicated by the line V—V of Figure 4.

Figure 6 is a sectional view taken on the plane indicated by the line VI—VI of Figure 4.

Figure 7 is a sectional view similar to Figure 6, but drawn on an enlarged scale and illustrating in dotted lines the effect upon the head of the fastener of a substantial contraction of the shank thereof and the position of the fastener parts when it may be freely shifted along the length of the molding.

Figures 8 and 9 are respectively, side elevation and plan views of a modified form of fastener.

Figure 10 is a sectional view of a modified arrangement showing how moldings may be attached to a wooden supporting structure by means of the fastener of the present invention.

Like reference characters indicate like parts throughout the several figures.

The spring fastener constituting an essential part of the present invention is preferably constructed from a narrow band of sheet metal by bending the metal so that the mid-portion forms a shank 10 and so that the ends thereof, together form the head 11 of the fastener. Preferably the strip of metal from which the fastener is formed is narrower between the ends thereof, the shank being formed from the narrow portion, as illustrated in the drawing, and the head 11 from the wider ends. The shank 10 is formed by doubling the strip of material to form legs 12 and 13, and a nose 14 constituting the tip of the shank. The legs 12 and 13 are bowed outwardly between the nose 14 and the head 11 providing guiding surfaces 15 and 16 that converge toward the nose 14 and to provide holding surfaces 17 and 18 that diverge from the head.

The preferably widened ends of the strip of metal from which the spring fastener is formed are bent at an acute angle to the legs 12 and 13 providing head sections 19 and 20, which are normally disposed in acute angular relation to each other, as illustrated in full lines in Figure 1. Preferably the head sections 19 and 20 are angularly related to the legs of the shank of the fastener so that when the legs of the fastener are brought approximately into contact with each other, said head sections are disposed approximately in the same plane as illustrated in dotted lines in Figure 1.

The fastener just described is preferably bent into the form illustrated prior to the tempering of the metal from which it is formed and after it is bent in such form the metal is tempered so that the head as well as the shank has the required degree of stiffness and resilience.

The fastener just described is peculiarly adapted to satisfactorily secure hollow moldings in place upon a suitable supporting structure of sheet metal character. Finishing moldings are frequently constructed of sheet metal by bending inwardly the edges of an elongated strip of metal, as illustrated in the drawing, which shows a sheet metal molding of such preferred form, consisting of a body 21, the edges of which are turned inwardly as shown at 22 and 23 in spaced relation to the under side of the body 21, providing channels between said body and the inturned edges.

In applying such moldings it is desirable to assemble the fasteners with respect to the molding at the proper points along the length thereof, which points are determined by the location of the perforations or openings of the supporting structure in which the fasteners are to be engaged. The fasteners of the present invention permit the ready approximate location thereof at the proper points along the length of the molding, and when in applied position will remain in place during the application of the molding to the supporting structure.

The fasteners are assembled by sliding the head sections into the channels provided between the inwardly turned edges and the body of the molding from either end of the molding. The width of the head sections is made to correspond to the inside width of the moldings between the bottoms of the channels formed by the inturned edges, so that the fastener can be freely slid lengthwise of the molding without capability of substantial turning movement about an axis approximately at right angles to the planes of the head sections. In entering the head sections of the fastener into the molding, pressure is applied to move the legs of the shank toward each other to the dotted line position indicated in Figure 7, so that the head sections will extend substantially at right angles to a line passing centrally longitudinally of the shank. In this position the fastener can be freely slid along the length of the molding, since the width of the channel exceeds the thickness of the strip of metal from which the fastener is formed. The shank of the fastener during the entry thereof in the hollow molding passes between the inturned edges of the molding being of a width materially less than the spacing of said flanges, while the head sections are of a width corresponding approximately to the inside dimension of the hollow molding, as above pointed out.

Each fastener is adjusted along the length of the molding by contracting the shank of the fastener and by bringing the head sections into right angular relation to the line just referred to, and the fasteners are moved until each is brought to its approximate position along the length of the molding when the shanks of the fasteners are permitted to expand. The condition of the fastener when it is being adjusted along the length of the molding to bring it into approximately correct position is indicated in dotted lines in Figure 7 of the drawing. As soon as the shank of the fastener is permitted to expand the legs 12 and 13 thereof spring apart and the head sections 19 and 20 spring toward their normal condition at an acute angle to a line extending centrally longitudinally of the fastener or to the full line position indicated in Figure 7. The normal angularity of said head section with respect to said lines is so designed with respect to the width of the channels in the molding that, when the fastener assumes the full line position of the figure just referred to, said head sections have not quite assumed their normal relation with respect to the shank of the fastener with the result that each section is maintained at a slightly greater angle to a line passing centrally longitudinally of the shank than in the normal condition of the fastener, so that the head sections firmly contact with the inturned edges of the molding and the body portion due to the fact that said sections are bent slightly from their normal positions in engagement with the underside of the body and the inturned edges of the molding. As a result, as soon as the shank of the fastener is permitted to expand, the head sections yieldingly or resiliently engage between the inturned edges and the body of the molding and the fasteners remain fixedly in position at the point along the length of the molding at which they are applied.

A fastener is assembled along the length of the molding at every point at which a fastener receiving opening is applied in the supporting structure to which the molding is to be attached, and after all of the fasteners have been assembled with respect to the molding in the manner just stated, the molding is ready for application to the supporting structure.

In order to illustrate the application of the molding to the supporting structure, a plate-like supporting structure 24 is shown in the drawings provided with a plurality of openings 25 that may be formed in any suitable outline. The supporting structure may assume any form and a fragment of a flat supporting surface is selected for illustration by way of example. The noses 14 of the protruding fasteners are brought into engagement with the walls of the openings 25 in the supporting structures, and pressure is applied in a direction along the shank of the fastener to force the resilient shank thereof through said opening. If the fasteners are not in precisely the correct position, they will automatically adjust themselves during the insertion of the shank of the fastener in the perforation or opening 25, so long as the fasteners are closely enough in position with respect to the opening to permit the nose to be entered in the opening. The fasteners will automatically adjust or center themselves with respect to said opening, because as pressure is applied to the fastener the legs are moved towards each other inasmuch as the diameter of the opening is substantially less than the overall width of the shank of the fastener, and the wedge-shaped nose of the fastener engages opposite walls of the opening, causing the legs of the shank to move towards each other sufficiently to permit the fasteners to pass through said openings. In moving towards each other the legs of the fasteners free the head sections from engagement with the body and the inturned edges of the molding temporarily, and the fastener will shift slightly if the center of the tip of the nose is not in exact alignment with the center of the opening.

After the widest part of the shank of the fastener passes through the opening, the legs 12 and 13 spring apart. The head sections are again engaged between the body and the inturned edges of the molding and in the final or holding position of the fastener the divergently disposed holding surfaces 17 and 18 thereof engage the inner corners of the opening. In the holding position of the fastener the legs of the shank of the fastener are forced closer toward each other than in their normal position when they are free from tension, with the result that the legs exert a continuously effective yielding pressure against the corner of the opening in the supporting structure and the inturned edge of the molding, forcing said edge and supporting structure into the acute angles formed between the head sections and the legs of the fasteners that carry them. In this way the fasteners exert a continuously effective holding action yieldingly drawing the molding toward the supporting structure, and the resilience of the shank of the fastener, and the resilience of the head sections mutually contribute to the effectiveness of this action.

While a fastener constructed of sheet metal in the manner just described, is preferred, it will be understood that the fasteners may be constructed of wire bent into proper form and then tempered to give the wire the desired degree of stiffness and resilience. Such a fastener is illustrated in Figures 8 and 9 of the drawing. In this modification the shank of the fastener is constructed from the mid-portion of the wire, which is bent into the same form as the fastener constructed of sheet metal, and like reference characters have been given to corresponding parts of said fastener.

In order to give the head of the fastener the necessary width to make it fit between the bottoms of the channels provided in the molding, the head sections 26 and 27, which are formed from the ends of the wire, which are angularly related with respect to the legs of the shank of the fastener in the same way as in the sheet metal fastener above described, preferably consist of short arms 28 and 29 terminating in loops 30 and 31, the external diameter of which corresponds approximately to the internal diameter of the moldings with which the fastener is to be used.

While circular loops are illustrated it will be readily understood that said loops may assume any other desired form that will give to the fastener the lateral stability and that will make it fit between the bottoms of the channels of the molding.

The modified fastener just described functions in the same manner as the sheet metal fastener first described, and its mode of use will accordingly not be further explained.

The fasteners above described are particularly well adapted to secure moldings or the like to metallic supporting structures, but it has been found that such fasteners may be very satisfactorily used to secure moldings or the like to wooden or similar supporting structures having substantial thickness, or a thickness exceeding the length of the shank of the fastener. An arrangement of this character is illustrated in Figure 10 of the drawing, in which a wooden supporting structure 32 is shown. In order to secure a molding 33 of the kind above described to said structure by means of a fastener 34 of either of the above types to said structure, the latter is provided with a hole 35 bored wholly or partially through said structure.

In securing the molding to said structure the fastener is assembled with respect thereto as above described and adjusted to its approximately correct position along the length thereof as above pointed out, and the shank 36 is entered into hole 35. The latter is formed so that its cross dimension is slightly less than the maximum width of said shank. The latter is forced into said hole and the shank contracted against the inherent resilience of the stiff material of which the fastener is constructed. In applied position the outer surfaces 37 and 38 of the outwardly bowed legs of the shank of the fastener frictionally engage the walls of the hole 35 thus preventing ready withdrawal of the fastener. The latter may be constructed of material of sufficient stiffness so that a biting engagement with the wooden supporting structure may be brought about if desired, the shank of the fastener being preferably contracted manually in such event prior to the entry thereof in the hole 35 being permitted to expand and bite into the wood after it has been inserted into the hole to substantially the desired extent.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. A spring fastener for hollow moldings having a longitudinal slit therein and constructed from a single piece of spring metal, comprising a head part consisting of the two flat ends of said piece of spring metal of a width greater than the width of said slit and a shank part formed from the mid portion of said piece of metal to a width less than the width of said slit, the head part being disposed in non-right angular relation to the shank part so that the over-all thickness of the head normally exceeds the inside height of said hollow molding and so that said thickness may be varied by bending said flat ends toward right angular relation with respect to said shank part.

2. A snap fastener for hollow moldings having a longitudinal slit of substantially less width than the internal cross-dimension of said molding and constructed from a single strip of resilient metal, comprising a head part constructed from the end portions of said strip of resilient metal to a width corresponding approximately to said cross-dimension and a shank part formed from the remainder of said strip of metal of a width less than that of the slit in the molding, said shank comprising only two legs that are bowed outwardly with respect to each other in a direction parallel to the length of the molding for which the fastener is designed, said head part including resilient flat portions that are normally inclined with respect to the edges of said molding forming said slit to an extent sufficient to cause said portions to firmly contact with opposite walls of said molding.

3. A sheet metal snap fastener for a hollow molding having a longitudinal slit of substantially less width than the internal cross-dimension of said molding, comprising a head part of a width exceeding the width of said slit and a shank part of a width less than the width of said slit, said head and shank comprising a single piece of spring metal having bends extending transversely to the length of the piece from which the fastener is formed, said head part having two resilient flat sections that each extend at an acute angle to the length of the molding so as to contact with opposite walls thereof.

BION C. PLACE.